United States Patent

Weckler

[15] 3,648,051

[45] Mar. 7, 1972

[54] PHOTOSENSOR CIRCUIT WITH INTEGRATED CURRENT DRIVE

[72] Inventor: Gene P. Weckler, Campbell, Calif.

[73] Assignee: Fairchild Camera and Instrument Corporation, Mount View, Calif.

[22] Filed: Mar. 3, 1970

[21] Appl. No.: 16,173

[52] U.S. Cl. .......................250/211 J, 250/220 M, 307/311, 317/235 N

[51] Int. Cl. .......................H01j 39/12

[58] Field of Search .............250/206, 207, 208, 209, 211 R, 250/211 J, 213 R, 213 A, 220 M; 317/235 N, 235 D, 235 Y; 307/311

[56] References Cited

UNITED STATES PATENTS 3,535,526 10/1970 Henry ................................250/211 J 3,427,461 2/1969 Weckler............................250/213 A 3,465,293 9/1969 Weckler............................250/220 M

*Primary Examiner*—Archie R. Borchelt

*Assistant Examiner*—D. C. Nelms

*Attorney*—Roger S. Borovoy, Alan MacPherson and Charles L. Botsford

[57] ABSTRACT

The collector of a common-base transistor is coupled to the emitter of a phototransistor, so that upon the application of suitable pulses to the emitter of the common-base transistor and a source of constant voltage to the collector of the phototransistor, output pulses are generated by the phototransistor whose width is a function of photon flux incident to the unconnected base of the phototransistor.

6 Claims, 4 Drawing Figures

Patented March 7, 1972 3,648,051

2 Sheets-Sheet 1

INVENTOR.
GENE P. WECKLER
BY

ATTORNEY

INVENTOR.
GENE P. WECKLER
BY Charles L. Botsford
ATTORNEY

PHOTOSENSOR CIRCUIT WITH INTEGRATED CURRENT DRIVE

BACKGROUND OF THE INVENTION

1. Field of the Invention

This invention relates to a photosensor circuit with integrated current drive for detecting incident radiant energy and generating one or more output pulses whose width is a function of the radiant power, also referred to as photon flux.

2. Description of the Prior Art

Previously, semiconductor photosensors incorporating transistors operating in the storage mode have made use of a voltage pulse to interrogate the photosensor. Periodic voltage pulses from a pulse generator function to recharge the space-charge capacity in the collector-base junction of the phototransistor in such a manner as to generate an output signal proportional to the incident photon flux, or radiant power impinging upon the base of the phototransistor. An integral of the amplitude of the output pulse is a measure of the quantity of charge needed to reestablish the initial condition on the space-charge capacity of the collector-base junction of the phototransistor. These photosensors are powered by what is known as a constant voltage drive. For a more detailed description, reference may be made to U.S. Pat. No. 3,427,461 issued Feb. 11, 1969 to the assignee of this application.

For some applications, however, it may be desirable to use a constant current drive, rather than a constant voltage drive. For example, for direct pulse-width modulation, the constant current drive approach is desired because an output pulse is produced whose width, rather than amplitude, varies as a function of the incident photon flux. Moreover, constant current drive allows one to vary the output-load resistor in such a manner as to reduce undesirable switching noise. Also, with a constant current drive, the emitter resistance of the phototransistor remains relatively constant during recharge, which reduces or eliminates the problem of image lag when detecting low levels of photon flux.

Therefore, for some applications, operating the photosensor with constant current drive to produce a pulse-width output is more desirable than with the prior art constant voltage drive.

SUMMARY OF THE INVENTION

The photosensor circuit of the invention features some of the advantages mentioned above by providing a phototransistor with a constant current drive that can be fabricated in the same monolithic semiconductor substrate as the phototransistor. The current drive presents to the phototransistor a current source with a fixed compliance. The compliance may be selected arbitrarily within certain limits by the selection of an external DC-voltage supply.

Briefly, the circuit comprises a transistor connected to operate in the storage mode and functioning as the phototransistor, and a transistor connected in the common-base configuration and functioning as a source of direct current of a predetermined level and fixed compliance that periodically charges the space-charge capacitance of the phototransistor. The resulting output signal is at a fixed amplitude but of a width proportional to the incident photon flux.

DESCRIPTION OF THE PREFERRED EMBODIMENTS

Figure 1:
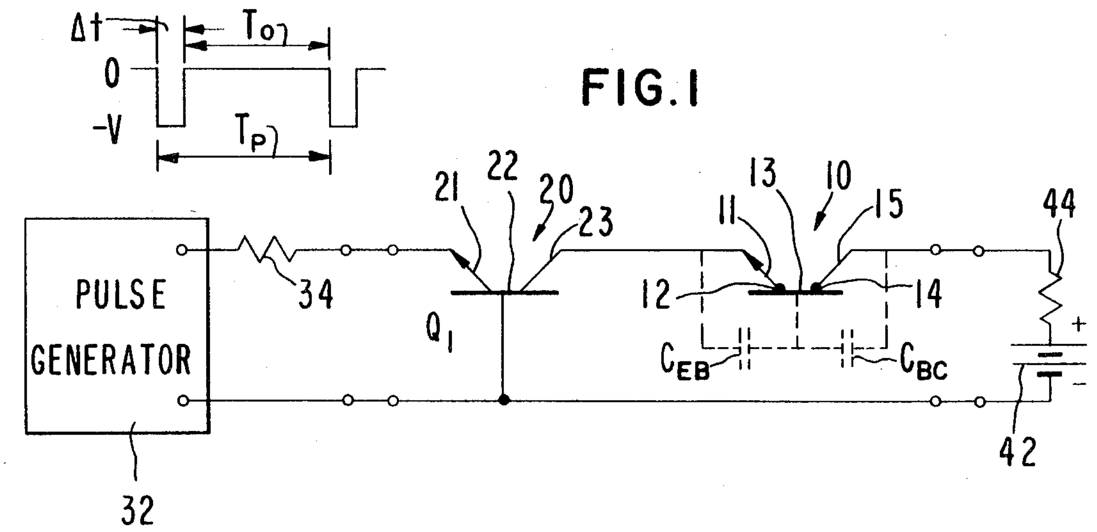
FIG. 1 is a simplified electrical schematic circuit diagram of the photosensor with constant current drive.

Referring to FIG. 1, the photosensor circuit with integrated current drive of the invention comprises a phototransistor 10 having an emitter 11, base 13, collector 15, emitter-base PN-junction 12, and collector-base PN-junction 14, with the base 13 unconnected to provide operation in the storage mode. Operation of a transistor in the storage mode is described in the previously mentioned U.S. Pat. No. 3,427,461.

A second transistor 20 is provided to function as a source of constant current drive for the phototransistor 10. Transistor 20 has an emitter 21, base 22, and collector 23, with the collector 23 coupled to the emitter 11 of the phototransistor 10. Although transistors 10 and 20 are shown as NPN-bipolar transistors, other types, such as PNP-bipolar transistors can be used with appropriate changes in polarity.

The output from an external pulse generator 32 via resistor 34 is coupled to the emitter 21 of current-drive transistor 20 and functions to provide periodically negative-going pulses of a predetermined width. The resistance value of resistor 34 should be large compared to the "on" resistance of the emitter-base junction of transistor 20. The amplitude of the voltage pulse "out" of pulse generator 32 is several times the "on" voltage of the emitter-base junction of transistor 20, in order to ensure that a resonably constant current is supplied to transistor 20 during a pulse phase.

Coupled to collector 15 of phototransistor 10 via a load resistor 44 is a source of constant voltage 42, such as a battery, of approximately 5 to 10 volts. This voltage determines the compliance of the equivalent constant current source. Compliance as used herein is defined as the voltage range over which the current source will maintain a constant current.

Operation of the photosensor circuit commences with the application of a negative-going pulse to emitter 21 of transistor 20. The width of the charging pulse from the pulse generator 32 is determined by the time required to bring the charge on phototransistor 10 from zero to full amount permitted by the compliance limits.

Because it is an NPN-type, transistor 20 is turned on by the pulse from generator 32, thereby allowing current between the emitter 21 and collector 23 and providing a source of constant current for driving phototransistor 10. Transistor 20 provides an impedance transformation between the driving means shown as pulse generator 32 and the phototransistor 10. A very low impedance load is presented to pulse generator 32 by transistor 20, but a very high impedance source is presented to transistor 10. Preferably, transistor 20 is selected so that the DC common-base, forward current transfer ratio from emitter to collector, $\alpha$, is approximately unity, and substantially the same current level is at emitter 21 and collector 23.

With its base 13 unconnected, transistor 10 appears in the circuit as a capacitor having capacitance value of $(\beta+1)C_{BC}$, where $C_{BC}$ is the space-charge capacitance of the base-collector junction 14, and $\beta$ is the common-emitter current gain. When voltage from battery 42 is applied to collector 15, and constant current from transistor 20 is applied to emitter 11, the capacitance of junction 14 starts charging. Charging ceases when transistor 20 saturates, that is when the compliance limit is reached, at which time the current into emitter 21 equals the current out of base 22.

The charging pulse from the pulse generator 32 then returns to zero, whereupon the integration of the photon flux begins. Incident photon flux causes a photogenerated current, which discharges the space-charge capacitance $C_{BC}$ of the collector-base junction 14 of phototransistor 10, as described in the aforementioned U.S. Pat. No. 3,427,461. Briefly, photon flux generates electron-hole pairs in both base and collector regions which are separated across the high field region of the reverse-biased collector-base junction 14.

The amount of discharge due to the photon flux is determined when the next pulse from the pulse generator 32 is applied to transistor 20, which starts the process once again of charging the space-charge capacitance of base-collector junction 14 of phototransistor 10. The quantity of charge needed to bring the space-charge capacitance of junction 14 up to full value is the product of the current through the load resistance 44, which is constant, and the time this current flows. This charge is proportional to the impinging radiant power, or photon flux, and a measure thereof.

Figure 2:
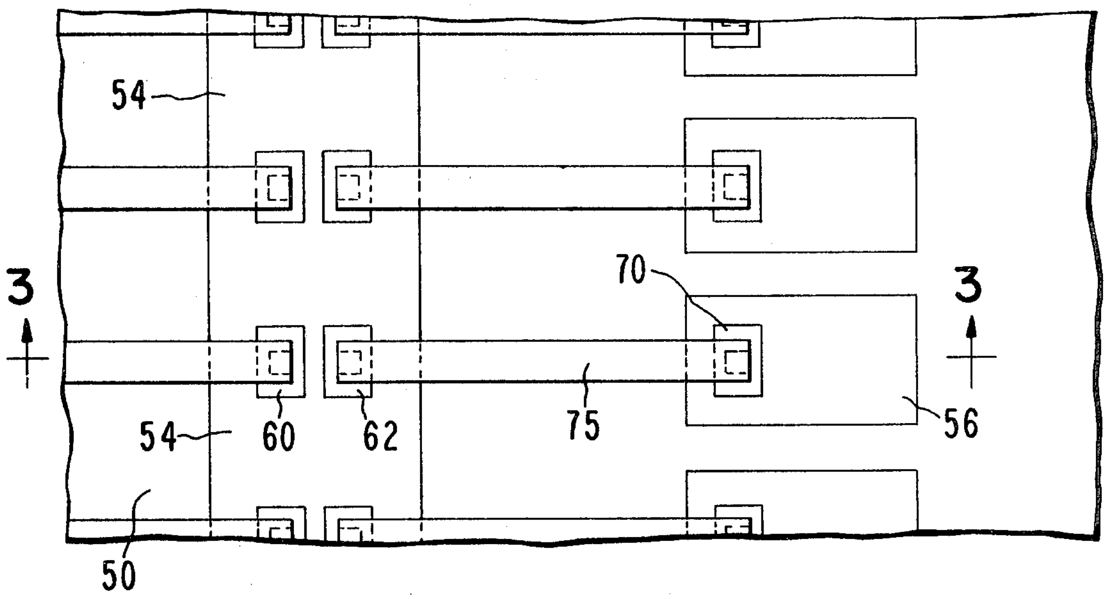
FIG. 2 is a simplified schematic drawing of the top view of pairs of integrated photosensor circuits with constant current drive located in the same semiconductor substrate, with the current drive transistors sharing the same base region.
Figure 3:
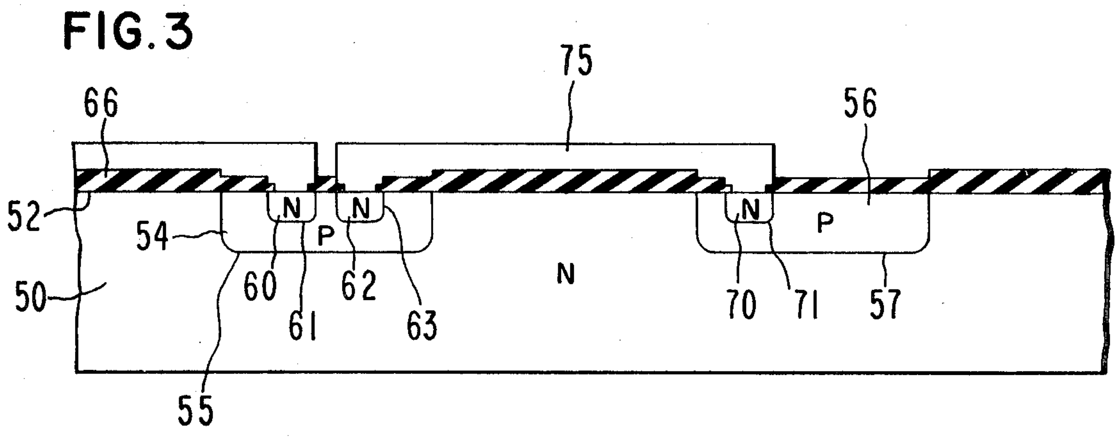
FIG. 3 is a simplified cross-sectional view of an integrated circuit pair of FIG. 2 along the lines 3—3.

Referring to FIG. 2, the top view of a portion of a typical semiconductor structure for integrating the photosensor circuit of the invention into a linear monolithic array is shown. Reference may also be made to FIG. 3, which shows a simplified cross-sectional view of a portion of the array structure along the lines 3—3 of FIG. 2. The array comprises a substrate 50 of semiconductor material of one conductivity type, such as N-type which typically functions as the collector for the phototransistor. Located within the substrate 50 and extending from the principal surface 52 thereof are a pair of spaced base regions 54 and 56 of opposite conductivity type, such as P-type, forming respective PN-junctions 55 and 57 with substrate 50. Junctions 55 and 57 typically are the collector-base junctions. Base region 54 suitably extends laterally through the substrate 50 and functions as the common base for all of the current-drive transistors in the array, whereas a plurality of spaced base regions similar to region 56 are provided, one base region for each phototransistor.

Located within base region 54 and extending from the upper surface 52 are a pair of spaced regions 60 and 62 of one conductivity type, such as N-type, which form with base region 54 a pair of spaced PN-junctions 61 and 63. Typically, region 60 is the emitter and region 62 is the collector of a lateral current-drive transistor. A plurality of such emitter-collector combinations are located in common-base region 54, one combination for each current-drive transistor. A layer of protective, passivating oxide 66 is located over at least portions of the principal surface 52 and covers at least the upper surface edges of any PN-junction located thereat.

Located within the other base region 56 and extending from the upper surface 52 is a region 70 of one conductivity type, such as N-type, which forms PN-junction 71 with region 56. Typically, region 70 is the emitter, 56 the base, and the substrate 50 is the collector of a phototransistor. A plurality of such phototransistors exist within the array. Electrical contact is provided between collector 62 of the current-drive transistor and emitter 70 of the phototransistor via interconnect layer 75, which comprises conductive material located atop oxide layer 66, but extends through openings therein to be in ohmic contact with the respective regions. A plurality of such interconnect layers are provided one for each combination of current-drive transistor and phototransistor.

The common-base lateral NPN-transistors formed in common-base region 54 need have a beta that is only equal to or greater than 10, since these transistors are operated in the common-base configuration and function as impedance transformers. A beta equal to or greater than ten can easily be obtained by processing the devices so that the lateral distance between the emitter region 60 and collector region 62 is on the order of microns. Conveniently, the emitter 60 and collector 62 of the lateral NPN-transistor may be formed simultaneously with formation of the emitter 70 of the phototransistor. Thus, only a minimum of processing steps are needed to integrate the current drive-phototransistor combination into the same semiconductor substrate.

Figure 4:
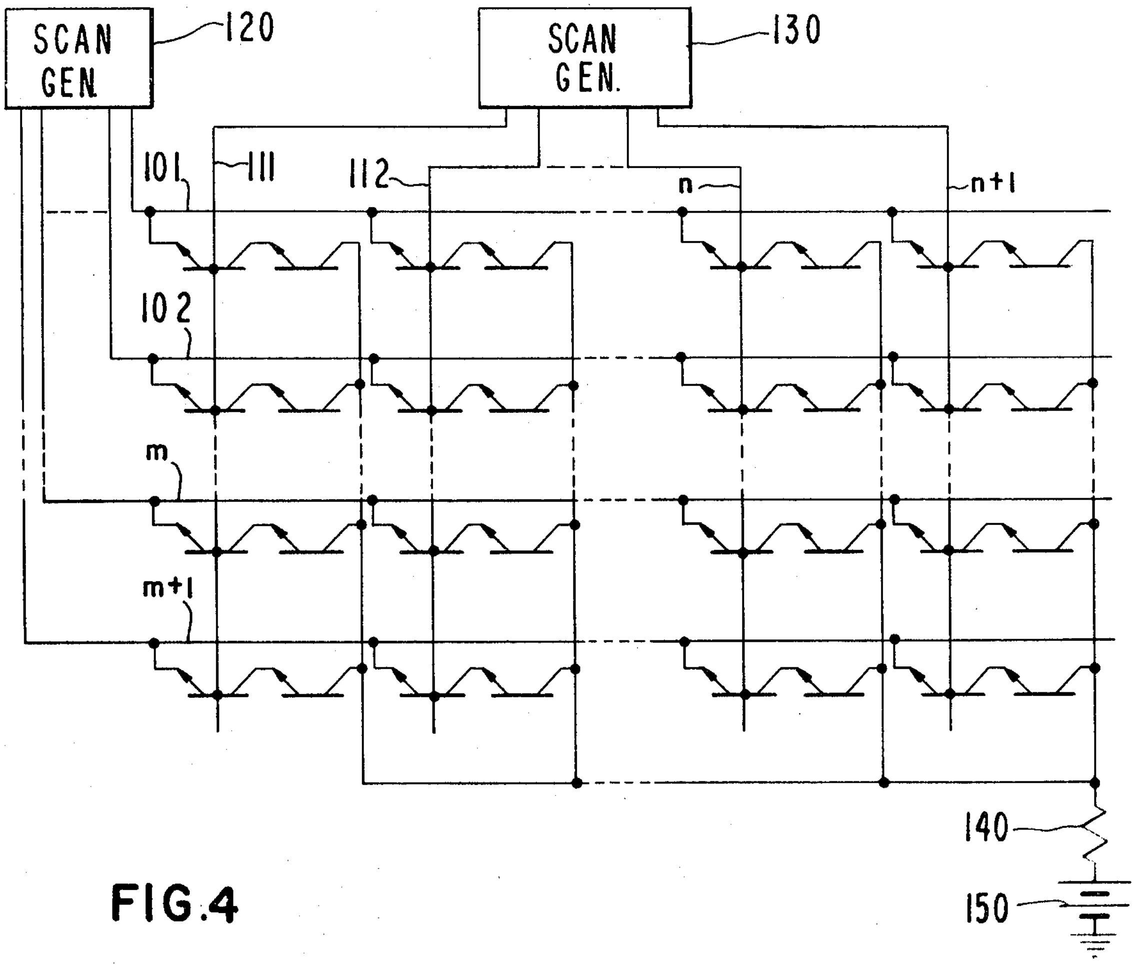
FIG. 4 is a simplified electrical schematic diagram of a matrix of photosensor circuits with constant current drive capable of being integrated into a monolithic semiconductor substrate.

Referring to FIG. 4, an area array of photosensor circuits with constant current drive suitably comprises the linear arrays of FIG. 2, which have been paralleled in two directions and interconnected as indicated in FIG. 3. The area array comprises a series of rows 101, 102,...*m*, *m*+1, and columns 111, 112,...*n*, *n*+1. A row scan generator 120 having multiple outputs is coupled in parallel to each of the rows, while a column scan generator 130 also having multiple outputs is coupled in parallel to each of the columns. Each of the scan generators 120 and 130 suitably comprises a shift register with one circulating bit, that is, a ring counter. The row scan generator 120 furnishes input pulses of a constant current and width to the emitter of each of the current-drive transistors located in a particular row. The column scan generator 130 provides a constant current pulse to the common base of each of the current-drive transistors located in a particular column. A load resistor 140 and a source of constant voltage, such as battery 150, are coupled to the output of the array, that is, to the collectors of all of the phototransistors.

Operation of the area array of FIG. 4 begins when a negative-going pulse with respect to ground potential of a predetermined amplitude is supplied to the bases of all of the current-drive transistors by the column scan generator 130, except for the current-drive transistors in the *n*th column, whose bases are biased at 0 volts with respect to ground potential. The row scan generator 120 holds the emitters of each of the current-drive transistors at 0 volts with respect to ground except for the transistors in the *m*th row whose emitters are biased at a predetermined negative voltage level with respect to ground potential. All of the current-drive transistors in the area array are therefore inactive, except for the current-drive transistor located at row *m*, column *n*, because the emitter-base junctions of all but current-drive transistor *mn* are either reverse biased or at zero bias. Only the current-drive transistor *mn* is forward biased, because a negative voltage is on the emitter, and zero voltage is on the base. Interrogation of any photosensor circuit in the array is made in the same manner.

While the invention has been described with reference to particular embodiments, the scope of the invention is not limited to the embodiments shown, but the concepts described herein may be applied to numerous other embodiments as will be obvious to one skilled in the art.

What is claimed is:

1. A photosensor circuit with constant current drive for detecting incident photon flux and generating one or more output pulses whose width is a function of the photon flux, the circuit comprising:

a first bipolar transistor having a collector, base and emitter, and a pair of PN-junctions, the base unconnected to provide operation in the storage mode;

an output terminal coupled to the collector of said first transistor, said output terminal adapted to receive a source of constant voltage;

a first input terminal adapted to receive a series of selectively applied pulses of a predetermined amplitude and width;

a second bipolar transistor having a collector, base, and emitter, and a pair of PN-junctions, the collector coupled to the emitter of said first transistor and the emitter coupled to said input terminal;

a second input terminal coupled to the base of said second transistor, said second input terminal adapted to receive a source of fixed potential, said circuit generating output pulses whose width is a function of the photon flux incident to the base of said first transistor.

2. The circuit of claim 1 further defined by means for selectively applying a series of pulses to the base of each of the second transistors.

3. An array of a plurality of photosensor circuits with constant current drive as defined in claim 1, the circuits arranged in rows and columns, the array further defined by:

one terminal for each row being coupled to the emitter electrode of each said second transistor in said row, one terminal in each column being coupled to the base of each said second transistor in said column;

the collector of all said first transistors being coupled to said output terminal, upon selective application of pulses to the row and column input terminals said array generates pulse signals whose width is a function of the photon flux incident to the base of a selected first transistor.

4. A semiconductor structure comprising:

a semiconductor substrate of one conductivity type having a principal surface;

first and second regions of opposite conductivity type located within the substrate and extending from the principal surface, the regions spaced apart from each other, each region forming a PN-junction with the substrate, each junction having an edge at the principal surface;

third and fourth regions of one conductivity type located within the first region and extending from the principal surface, the third and fourth regions spaced apart and each forming a PN-junction with the first region, each junction having an edge at the upper surface, said first, third and fourth regions forming a bipolar transistor;

a fifth region of one conductivity type located within the second region and extending from the principal surface, the fifth region forming a PN-junction with the second region, the junction having an edge at the upper surface, said fifth and second regions and said substrate forming a bipolar transistor;

a layer of protective, passivating material overlying portions of the upper surface including the surface edge of each of the PN-junctions, the protective layer formed to expose selected portions of the first, third, fourth and fifth regions so that electrical contact can be made thereto, at least the portion of the protective layer overlying the second region being transparent;

layers of conductive material selectively located over the protective layer and extending therethrough to make ohmic contact to the substrate and the first, third, fourth and fifth regions, but not to the second region.

5. The structure as recited in claim 4 wherein at least one of the conductive layers extends to couple the fourth region to the fifth region.

6. The structure as recited in claim 5 wherein the substrate comprises the collector, the second region comprises the base, and the fifth region comprises the emitter of a phototransistor; and wherein the first region comprises the base, the third region comprises the emitter and the fourth region comprises the collector of a second transistor, said third region being adapted to receive a series of pulses of a predetermined amplitude and width and said substrate being adapted to receive a source of constant voltage the device generating output pulses whose width is a function of the photon flux incident upon the second region.

* * * * *